US 11,961,373 B2

(12) United States Patent
Shturma et al.

(10) Patent No.: US 11,961,373 B2
(45) Date of Patent: Apr. 16, 2024

(54) METHOD AND SYSTEM OF TOUCH-FREE VENDING

(71) Applicant: PepsiCo, Inc., Purchase, NY (US)

(72) Inventors: Igor Shturma, Sunnyvale, CA (US); Sasha Shturma, San Jose, CA (US)

(73) Assignee: PepsiCo, Inc., Purchase, NY (US)

( * ) Notice: Subject to any disclaimer, the term of this patent is extended or adjusted under 35 U.S.C. 154(b) by 366 days.

(21) Appl. No.: 17/364,800

(22) Filed: Jun. 30, 2021

(65) Prior Publication Data

US 2022/0012975 A1 Jan. 13, 2022

Related U.S. Application Data

(60) Provisional application No. 63/047,047, filed on Jul. 1, 2020.

(51) Int. Cl.
*G07F 9/00* (2006.01)
*G06Q 20/20* (2012.01)
*G06Q 20/32* (2012.01)
*G06Q 20/02* (2012.01)
*G07F 17/00* (2006.01)

(52) U.S. Cl.
CPC ........... *G07F 9/001* (2020.05); *G06Q 20/203* (2013.01); *G06Q 20/208* (2013.01); *G06Q 20/3274* (2013.01); *G06Q 20/027* (2013.01); *G07F 17/0014* (2013.01)

(58) Field of Classification Search
None
See application file for complete search history.

(56) References Cited

U.S. PATENT DOCUMENTS

| 3,270,918 | A | 9/1966 | Goodrich et al. |
|---|---|---|---|
| 5,165,575 | A | 11/1992 | Scott |
| 5,181,631 | A | 1/1993 | Credle, Jr. et al. |
| 5,318,197 | A | 6/1994 | Martindale et al. |
| 5,566,732 | A | 10/1996 | Nelson |
| 6,230,767 | B1 | 5/2001 | Nelson |

(Continued)

FOREIGN PATENT DOCUMENTS

| DE | 102017130615 A1 | 6/2019 |
|---|---|---|
| EP | 1281137 B1 | 9/2003 |

(Continued)

*Primary Examiner* — Gene O Crawford
*Assistant Examiner* — Ayodeji T Ojofeitimi
(74) *Attorney, Agent, or Firm* — Sterne, Kessler, Goldstein & Fox P.L.L.C.

(57) ABSTRACT

A method and system to access vending machines via a touch-free user interface using a personal electronic device (PED) are described. For each vending session, a unique dynamic tag is generated and presented on a vending machine to be read via a camera. The tag is forwarded by the PED to a remote servicer, which accesses a remote database to determine real-time inventory of the vending machine. This inventory list is transmitted back to the PED for display to a user. The user selects a product from inventory using her PED. This selection is sent to the server, which then transmits instructions to the vending machine to dispense the selected product. The method is free of a requirement for the user to download an app. Security and payment are assured by the use of a unique dynamic tag for each vending session, displayed on or by the vending machine.

8 Claims, 8 Drawing Sheets

(56) References Cited

U.S. PATENT DOCUMENTS

| | | |
|---|---|---|
| 6,234,222 B1 | 5/2001 | Nelson |
| 6,237,652 B1 | 5/2001 | Nelson |
| 6,345,729 B1 | 2/2002 | Santy, Jr. et al. |
| 6,424,884 B1 | 7/2002 | Brooke, Jr. et al. |
| 6,564,999 B1 | 5/2003 | Saveliev et al. |
| 6,572,016 B2 | 6/2003 | Saveliev et al. |
| 6,584,309 B1 | 6/2003 | Wingham |
| 6,600,969 B2 | 7/2003 | Sudolcan et al. |
| 6,616,037 B2 | 9/2003 | Grimm et al. |
| 6,684,920 B2 | 2/2004 | Seitz et al. |
| 6,759,072 B1 | 7/2004 | Gutwein et al. |
| 6,764,003 B1 | 7/2004 | Martschitsch et al. |
| 6,850,816 B2 | 2/2005 | Garratt |
| 6,935,532 B2 | 8/2005 | Tinucci et al. |
| 6,945,157 B2 | 9/2005 | Brown et al. |
| 7,004,355 B1 | 2/2006 | Crisp, III et al. |
| 7,031,804 B2 | 4/2006 | Brooke, Jr. et al. |
| 7,032,818 B2 | 4/2006 | Thomas et al. |
| 7,110,954 B2 | 9/2006 | Yung et al. |
| 7,197,377 B2 | 3/2007 | Knepler |
| 7,223,427 B2 | 5/2007 | Knepler |
| 7,257,547 B1 | 8/2007 | Terase |
| 7,265,673 B2 | 9/2007 | Teller |
| 7,320,414 B2 | 1/2008 | Davis |
| 7,331,483 B2 | 2/2008 | Bhimani et al. |
| 7,353,850 B2 | 4/2008 | Grewie et al. |
| 7,387,239 B2 | 6/2008 | Thomas et al. |
| 7,439,859 B2 | 10/2008 | Humphrey |
| 7,445,133 B2 | 11/2008 | Ludovissie et al. |
| 7,455,867 B1 | 11/2008 | Gutwein et al. |
| 7,458,510 B1 | 12/2008 | Zhou |
| 7,464,835 B2 | 12/2008 | Coronado et al. |
| 7,574,377 B2 | 8/2009 | Carpelli |
| 7,593,867 B2 | 9/2009 | Deakin et al. |
| 7,611,052 B2 | 11/2009 | Gosi et al. |
| 7,617,850 B1 | 11/2009 | Dorney |
| 7,624,895 B2 | 12/2009 | Haskayne |
| 7,627,496 B2 | 12/2009 | Walker et al. |
| 7,637,205 B2 | 12/2009 | Greiwe et al. |
| 7,651,008 B2 | 1/2010 | Sher et al. |
| 7,654,191 B2 | 2/2010 | Greenwald et al. |
| 7,757,896 B2 | 7/2010 | Carpenter et al. |
| 7,762,181 B2 | 7/2010 | Boland et al. |
| 7,779,099 B2 | 8/2010 | Raghunathan et al. |
| 7,806,294 B2 | 10/2010 | Gatipon et al. |
| 7,813,834 B2 | 10/2010 | Sudolcan et al. |
| 7,845,375 B2 | 12/2010 | Dorney |
| 7,881,822 B2 | 2/2011 | Thornton et al. |
| 7,889,182 B2 | 2/2011 | Romanyszyn et al. |
| 7,890,209 B2 | 2/2011 | Knepler |
| 7,899,713 B2 | 3/2011 | Rothschild |
| 7,900,799 B2 | 3/2011 | Kuzar et al. |
| 7,913,878 B1 | 3/2011 | Baron et al. |
| 7,918,156 B2 | 4/2011 | Greenwald et al. |
| 7,972,639 B2 | 7/2011 | Guerrero et al. |
| 7,997,448 B1 | 8/2011 | Leyva |
| 8,015,088 B2 | 9/2011 | Phillips et al. |
| 8,032,420 B2 | 10/2011 | Dziaba et al. |
| 8,062,684 B2 | 11/2011 | Gutwein et al. |
| 8,091,735 B2 | 1/2012 | Girard et al. |
| 8,121,917 B2 | 2/2012 | Insolia et al. |
| 8,127,805 B2 | 3/2012 | Dorney |
| 8,130,083 B2 | 3/2012 | Dorney |
| 8,151,832 B1 | 4/2012 | Dorney |
| 8,155,784 B2 | 4/2012 | Lowe et al. |
| 8,162,176 B2 | 4/2012 | Rudick |
| 8,162,210 B2 | 4/2012 | McInerney et al. |
| 8,176,948 B2 | 5/2012 | Carrig |
| 8,181,822 B2 | 5/2012 | Doelman et al. |
| 8,245,739 B1 | 8/2012 | Wade et al. |
| 8,250,972 B2 | 8/2012 | Santoiemmo et al. |
| 8,251,258 B2 | 8/2012 | Rudick et al. |
| 8,332,272 B2 | 12/2012 | Fisher |
| 8,333,301 B2 | 12/2012 | Majer |
| 8,335,592 B2 | 12/2012 | Deo et al. |
| 8,340,815 B2 | 12/2012 | Peters et al. |
| 8,352,323 B2 | 1/2013 | Fisher |
| 8,408,255 B1 | 4/2013 | Wade et al. |
| 8,413,884 B2 | 4/2013 | Lim et al. |
| 8,417,377 B2 | 4/2013 | Rothschild |
| 8,434,319 B2 | 5/2013 | Klier et al. |
| 8,434,642 B2 | 5/2013 | Rudick |
| 8,442,674 B2 | 5/2013 | Tilton et al. |
| 8,459,043 B2 | 6/2013 | Bertone |
| 8,473,864 B2 | 6/2013 | Segal et al. |
| 8,490,829 B2 | 7/2013 | Deo et al. |
| 8,511,348 B2 | 8/2013 | Lillard, Jr. |
| 8,515,574 B2 | 8/2013 | Studor et al. |
| 8,520,897 B2 | 8/2013 | Boncyk et al. |
| 8,523,065 B1 | 9/2013 | Wade et al. |
| 8,561,830 B2 | 10/2013 | Hallberg |
| 8,565,916 B2 | 10/2013 | Zhang et al. |
| 8,584,900 B2 | 11/2013 | Metropulos et al. |
| 8,600,899 B1 | 12/2013 | Davis |
| 8,610,536 B2 | 12/2013 | Libby et al. |
| 8,610,684 B2 | 12/2013 | Kalu et al. |
| 8,635,164 B2 | 1/2014 | Kalu et al. |
| 8,688,277 B2 | 4/2014 | Studor et al. |
| 8,718,818 B2 | 5/2014 | Nordbryhn |
| 8,739,840 B2 | 6/2014 | Mattos, Jr. et al. |
| 8,744,618 B2 | 6/2014 | Peters et al. |
| 8,744,939 B2 | 6/2014 | Phillips et al. |
| 8,751,037 B2 | 6/2014 | Peters et al. |
| 8,755,932 B2 | 6/2014 | Peters et al. |
| 8,763,918 B2 | 7/2014 | Lillard, Jr. |
| 8,768,505 B2 | 7/2014 | Thompson |
| 8,774,963 B2 | 7/2014 | Signorelli et al. |
| 8,776,838 B1 | 7/2014 | Dorney |
| 8,781,622 B2 | 7/2014 | Mockus et al. |
| 8,788,090 B2 | 7/2014 | Rothschild |
| 8,788,359 B2 | 7/2014 | Stache et al. |
| 8,798,799 B2 | 8/2014 | Deo et al. |
| 8,800,867 B2 | 8/2014 | Majer |
| 8,805,594 B2 | 8/2014 | Shah et al. |
| 8,814,000 B2 | 8/2014 | Rudick |
| 8,825,538 B2 | 9/2014 | Insolia et al. |
| 8,833,241 B2 | 9/2014 | Santoiemmo |
| 8,839,343 B2 | 9/2014 | Wang |
| 8,851,329 B2 | 10/2014 | Rudick et al. |
| 8,863,649 B1 | 10/2014 | Rao et al. |
| 8,880,427 B1 | 11/2014 | Jones |
| 8,899,280 B2 | 12/2014 | Deo et al. |
| 8,902,818 B2 | 12/2014 | Chu et al. |
| 8,903,737 B2 | 12/2014 | Cameron et al. |
| 8,910,674 B2 | 12/2014 | Segiet et al. |
| 8,942,628 B2 | 1/2015 | Haverinen |
| 8,945,374 B2 | 2/2015 | Chase |
| 8,959,028 B2 | 2/2015 | Canter et al. |
| 8,960,075 B2 | 2/2015 | Traitler et al. |
| 8,960,500 B2 | 2/2015 | Petrus et al. |
| 8,972,048 B2 | 3/2015 | Canora et al. |
| 8,996,178 B2 | 3/2015 | Studor et al. |
| 9,014,846 B2 | 4/2015 | Newman |
| 9,020,635 B2 | 4/2015 | Hortin |
| 9,023,245 B2 | 5/2015 | Chakravarti et al. |
| 9,026,245 B2 | 5/2015 | Tilton et al. |
| 9,045,323 B2 | 6/2015 | Crane et al. |
| 9,051,162 B2 | 6/2015 | Peters et al. |
| 9,054,818 B2 | 6/2015 | Wang |
| 9,061,879 B2 | 6/2015 | Patthey |
| 9,071,926 B2 | 6/2015 | Krishnan et al. |
| 9,092,768 B2 | 7/2015 | Breitenbach et al. |
| 9,102,508 B2 | 8/2015 | O'Keefe, Jr. et al. |
| 9,107,449 B2 | 8/2015 | Njaastad et al. |
| 9,111,271 B2 | 8/2015 | Dennis |
| 9,111,303 B2 | 8/2015 | Nicol et al. |
| 9,111,312 B2 | 8/2015 | Jones |
| 9,113,749 B2 | 8/2015 | Castellani et al. |
| 9,135,613 B2 | 9/2015 | Dennis |
| 9,149,152 B2 | 10/2015 | Cahen et al. |
| 9,169,112 B2 | 10/2015 | Chase et al. |
| 9,199,833 B2 | 12/2015 | Scarvelli |
| 9,212,040 B2 | 12/2015 | Segiet et al. |
| 9,218,704 B2 | 12/2015 | Lim et al. |

(56) References Cited

U.S. PATENT DOCUMENTS

| | | |
|---|---|---|
| 9,245,402 B2 | 1/2016 | Green et al. |
| 9,245,403 B2 | 1/2016 | Geigel et al. |
| 9,246,611 B2 | 1/2016 | Wang |
| 9,265,375 B2 | 2/2016 | Knepler |
| 9,271,141 B1 | 2/2016 | Egeler et al. |
| 9,297,577 B2 | 3/2016 | Anselmino et al. |
| 9,305,296 B1 | 4/2016 | Burger |
| 9,334,149 B2 | 5/2016 | Dorney |
| 9,334,150 B1 | 5/2016 | Ost et al. |
| 9,346,659 B2 | 5/2016 | Brown |
| 9,349,238 B2 | 5/2016 | Tkachenko et al. |
| 9,365,406 B2 | 6/2016 | Hortin |
| 9,373,091 B1 | 6/2016 | Belser et al. |
| 9,434,596 B2 | 9/2016 | Carpenter et al. |
| 9,445,259 B2 | 9/2016 | Sheth et al. |
| 9,454,868 B2 | 9/2016 | Hirshbain |
| 9,457,928 B2 | 10/2016 | Evers et al. |
| 9,472,043 B2 | 10/2016 | Subramanian et al. |
| 9,473,478 B2 | 10/2016 | Subramanian et al. |
| 9,475,683 B2 | 10/2016 | Givens et al. |
| 9,495,616 B2 | 11/2016 | Carbonini |
| 9,495,673 B2 | 11/2016 | Cameron et al. |
| 9,499,385 B1 | 11/2016 | Studor |
| 9,499,387 B2 | 11/2016 | Nicol et al. |
| 9,511,988 B2 | 12/2016 | Hernandez et al. |
| 9,521,922 B2 | 12/2016 | Deo et al. |
| 9,527,715 B2 | 12/2016 | Boggs et al. |
| 9,533,783 B2 | 1/2017 | Talarico |
| 9,533,867 B2 | 1/2017 | Hortin |
| 9,536,236 B2 | 1/2017 | Hay |
| 9,595,058 B2 | 3/2017 | Khalid |
| 9,600,850 B2 | 3/2017 | Holman et al. |
| 9,624,460 B2 | 4/2017 | Wunder |
| 9,646,314 B2 | 5/2017 | Moore et al. |
| 9,647,777 B2 | 5/2017 | Wang |
| 9,666,013 B2 | 5/2017 | Want et al. |
| 9,679,329 B2 | 6/2017 | Jones |
| 9,701,530 B2 | 7/2017 | Kline et al. |
| 9,721,060 B2 | 8/2017 | Chung et al. |
| 9,751,744 B2 | 9/2017 | Grottini |
| 9,751,745 B2 | 9/2017 | Grottini |
| 9,764,935 B2 | 9/2017 | Jersey et al. |
| 9,783,403 B2 | 10/2017 | Tansey, Jr. |
| 9,803,914 B2 | 10/2017 | Anselmino et al. |
| 9,809,437 B2 | 11/2017 | Tansey, Jr. |
| 9,870,670 B2 | 1/2018 | Yau |
| 9,898,884 B1 | 2/2018 | Arora et al. |
| 9,911,267 B2 | 3/2018 | Signorelli et al. |
| 9,926,186 B2 | 3/2018 | Nicol et al. |
| 9,932,216 B2 | 4/2018 | Hernandez et al. |
| 9,934,657 B2 | 4/2018 | Tkachenko et al. |
| 9,942,796 B2 | 4/2018 | Raleigh |
| 9,959,530 B2 | 5/2018 | Geigel et al. |
| 9,975,752 B2 | 5/2018 | Keating et al. |
| 10,009,351 B2 | 6/2018 | Choi |
| 10,019,864 B2 | 7/2018 | Tomkins et al. |
| 10,031,505 B2 | 7/2018 | Martindale et al. |
| 10,046,959 B2 | 8/2018 | Rudick |
| 10,057,709 B2 | 8/2018 | Wegelin et al. |
| 10,074,083 B2 | 9/2018 | Westby et al. |
| 10,083,430 B2 | 9/2018 | Hay |
| 10,101,080 B2 | 10/2018 | Willis et al. |
| 10,109,143 B2 | 10/2018 | Signorelli et al. |
| 10,127,419 B1 * | 11/2018 | Tungala ............... G06Q 10/087 |
| 10,158,721 B2 | 12/2018 | Jarnagin, III |
| 10,227,226 B2 | 3/2019 | Jersey et al. |
| 10,252,149 B2 | 4/2019 | Huang et al. |
| 10,255,746 B2 | 4/2019 | Peters et al. |
| 10,315,907 B2 | 6/2019 | Segiet et al. |
| 10,328,769 B2 | 6/2019 | Ferguson et al. |
| 10,377,623 B2 | 8/2019 | Arcand |
| 10,380,822 B2 | 8/2019 | Signorelli et al. |
| 10,384,925 B2 | 8/2019 | Cuppari et al. |
| 10,410,272 B1 | 9/2019 | Johnson et al. |
| 10,417,624 B2 | 9/2019 | Salvucci et al. |
| 10,433,670 B2 | 10/2019 | Flick |
| 10,438,184 B2 | 10/2019 | Barragan et al. |
| 10,445,754 B2 | 10/2019 | Snider et al. |
| 10,460,547 B2 | 10/2019 | Yau |
| 10,482,443 B2 | 11/2019 | Suelberg |
| 10,489,763 B2 | 11/2019 | Kamat |
| 10,489,868 B2 | 11/2019 | Long, II |
| 10,497,200 B2 | 12/2019 | Guar et al. |
| 10,504,171 B2 | 12/2019 | Khalid |
| 10,540,702 B2 | 1/2020 | Conforti |
| 10,542,838 B2 | 1/2020 | Rithener et al. |
| 10,544,028 B2 | 1/2020 | Guy et al. |
| 10,554,929 B2 | 2/2020 | Stephens et al. |
| 10,558,330 B2 | 2/2020 | Suh et al. |
| 10,562,757 B2 | 2/2020 | Biasi et al. |
| 10,595,669 B2 | 3/2020 | Noth |
| 10,602,334 B2 | 3/2020 | Kim |
| 10,628,789 B2 | 4/2020 | Hewet et al. |
| 10,664,482 B2 * | 5/2020 | Nalliah ............... G06Q 10/00 |
| 10,687,654 B2 | 6/2020 | Buchholz et al. |
| 10,721,625 B2 | 7/2020 | Mars et al. |
| 10,740,583 B2 | 8/2020 | Noth |
| 10,755,315 B2 | 8/2020 | Cuppari et al. |
| 10,759,644 B2 | 9/2020 | Lim et al. |
| 10,762,487 B2 | 9/2020 | Apodaca Salinas et al. |
| 10,769,625 B2 | 9/2020 | Pandiarajan et al. |
| 10,789,633 B2 | 9/2020 | Zises et al. |
| 10,796,518 B2 | 10/2020 | Dubey |
| 10,810,565 B2 | 10/2020 | Davis |
| 10,810,689 B2 | 10/2020 | Insolia et al. |
| 10,820,746 B2 | 11/2020 | Noth |
| 10,853,832 B2 | 12/2020 | Wittek |
| 10,854,033 B2 | 12/2020 | Jafa et al. |
| 10,861,276 B1 | 12/2020 | Arora et al. |
| 10,874,238 B2 | 12/2020 | Nieraad et al. |
| 10,891,614 B2 | 1/2021 | Patel |
| 10,899,595 B2 | 1/2021 | Cuppari |
| 10,902,400 B2 | 1/2021 | Abu Hamam |
| 10,919,752 B2 | 2/2021 | Breault |
| 10,932,610 B2 | 3/2021 | Nachawati |
| 10,986,167 B2 | 4/2021 | Raboin |
| 10,991,184 B2 | 4/2021 | Jee et al. |
| 11,043,060 B1 | 6/2021 | Murphy |
| 11,059,713 B2 | 7/2021 | Connor |
| 11,084,704 B2 | 8/2021 | Sawhney et al. |
| 11,087,376 B2 | 8/2021 | Cuppari et al. |
| 11,087,579 B2 | 8/2021 | Yau |
| 2003/0071806 A1 | 4/2003 | Annand |
| 2003/0200008 A1 | 10/2003 | Wilson |
| 2004/0088224 A1 | 5/2004 | Mukai |
| 2004/0167664 A1 | 8/2004 | Griffin |
| 2005/0029287 A1 | 2/2005 | Mobbs |
| 2005/0034606 A1 | 2/2005 | In Albon |
| 2005/0087255 A1 | 4/2005 | Humphrey et al. |
| 2005/0211768 A1 | 9/2005 | Stillman |
| 2006/0027599 A1 | 2/2006 | Edwards et al. |
| 2006/0118581 A1 | 6/2006 | Clark |
| 2006/0190128 A1 | 8/2006 | Brooke et al. |
| 2006/0190345 A1 | 8/2006 | Crowley |
| 2007/0026916 A1 | 2/2007 | Juds et al. |
| 2007/0036348 A1 | 2/2007 | Orr |
| 2007/0145074 A1 | 6/2007 | Sevcik |
| 2007/0212468 A1 | 9/2007 | White et al. |
| 2007/0235533 A1 | 10/2007 | Giordano |
| 2007/0239549 A1 | 10/2007 | Lafuci et al. |
| 2007/0261566 A1 | 11/2007 | Varney et al. |
| 2008/0066483 A1 | 3/2008 | Klier et al. |
| 2008/0083780 A1 | 4/2008 | Romanyszyn et al. |
| 2008/0126261 A1 | 5/2008 | Lovett |
| 2008/0153567 A1 | 6/2008 | Juds et al. |
| 2008/0189078 A1 | 8/2008 | Vok et al. |
| 2008/0195251 A1 | 8/2008 | Milner |
| 2008/0195252 A1 | 8/2008 | Innocenti et al. |
| 2008/0235766 A1 | 9/2008 | Wallos et al. |
| 2008/0257948 A1 | 10/2008 | Jochim et al. |
| 2009/0040050 A1 | 2/2009 | Humphrey |
| 2009/0152345 A1 | 6/2009 | Johnson |
| 2009/0157515 A1 | 6/2009 | Lafuci et al. |
| 2009/0177318 A1 | 7/2009 | Sizemore |

(56) References Cited

U.S. PATENT DOCUMENTS

| | | |
|---|---|---|
| 2009/0222339 A1 | 9/2009 | Anato et al. |
| 2010/0125362 A1 | 5/2010 | Canora et al. |
| 2010/0187298 A1 | 7/2010 | Phillips et al. |
| 2010/0198643 A1 | 8/2010 | Friedman et al. |
| 2011/0123688 A1 | 5/2011 | Deo et al. |
| 2011/0168775 A1 | 7/2011 | Van Zetten |
| 2011/0172814 A1 | 7/2011 | Breitenbach et al. |
| 2011/0184812 A1 | 7/2011 | Stoulil |
| 2011/0278191 A1 | 11/2011 | Lillard, Jr. |
| 2011/0298583 A1 | 12/2011 | Libby et al. |
| 2012/0018452 A1 | 1/2012 | Anliker et al. |
| 2012/0047007 A1 | 2/2012 | Halsey et al. |
| 2012/0103926 A1 | 5/2012 | Ibsies |
| 2012/0136479 A1 | 5/2012 | Signorelli et al. |
| 2012/0139735 A1 | 6/2012 | Dolliner et al. |
| 2012/0156337 A1 | 6/2012 | Studor et al. |
| 2012/0166117 A1 | 6/2012 | Warburton et al. |
| 2012/0245732 A1 | 9/2012 | Yoakim |
| 2013/0043304 A1 | 2/2013 | Agon et al. |
| 2013/0079926 A1 | 3/2013 | Peters et al. |
| 2013/0085600 A1 | 4/2013 | Nicol et al. |
| 2013/0087050 A1 | 4/2013 | Studor et al. |
| 2013/0092567 A1 | 4/2013 | Lok |
| 2013/0096715 A1 | 4/2013 | Chung et al. |
| 2013/0140324 A1 | 6/2013 | Deo et al. |
| 2013/0284029 A1 | 10/2013 | Reed et al. |
| 2013/0311284 A1 | 11/2013 | Quinn |
| 2013/0340453 A1 | 12/2013 | Chan |
| 2013/0341395 A1 | 12/2013 | Chan |
| 2014/0040055 A1 | 2/2014 | Quartarone et al. |
| 2014/0053944 A1 | 2/2014 | Wang |
| 2014/0053950 A1 | 2/2014 | Vandersteen |
| 2014/0059133 A1 | 2/2014 | Wang |
| 2014/0081777 A1 | 3/2014 | Mastrodonato et al. |
| 2014/0110476 A1 | 4/2014 | Sheehan et al. |
| 2014/0114469 A1 | 4/2014 | Givens et al. |
| 2014/0134299 A1 | 5/2014 | Guidorzi et al. |
| 2014/0142749 A1 | 5/2014 | Peters et al. |
| 2014/0196811 A1 | 7/2014 | Ramos, III et al. |
| 2014/0255883 A1 | 9/2014 | Macquet |
| 2014/0263447 A1 | 9/2014 | Peters, Jr. et al. |
| 2014/0290181 A1 | 10/2014 | Edwards et al. |
| 2014/0297026 A1 | 10/2014 | Peters, Jr. et al. |
| 2014/0309770 A1 | 10/2014 | Signorelli et al. |
| 2014/0337159 A1 | 11/2014 | Rothschild |
| 2014/0337795 A1 | 11/2014 | Deo et al. |
| 2014/0361035 A1 | 12/2014 | Rudick |
| 2014/0379123 A1 | 12/2014 | Hirshbain |
| 2015/0039776 A1 | 2/2015 | Jarnagin, III |
| 2015/0046877 A1 | 2/2015 | Cuppari et al. |
| 2015/0053302 A1 | 2/2015 | Willis et al. |
| 2015/0082243 A1 | 3/2015 | Taylor et al. |
| 2015/0110931 A1 | 4/2015 | Chase |
| 2015/0164264 A1 | 6/2015 | Studor et al. |
| 2015/0187160 A1 | 7/2015 | Anning |
| 2015/0191341 A1 | 7/2015 | Martindale et al. |
| 2015/0217985 A1 | 8/2015 | Raley |
| 2015/0225223 A1 | 8/2015 | Morales Lema |
| 2015/0225224 A1 | 8/2015 | Tilton et al. |
| 2015/0230653 A1 | 8/2015 | Cheng |
| 2015/0251891 A1 | 9/2015 | Peters et al. |
| 2015/0305548 A1 | 10/2015 | Girault et al. |
| 2015/0317860 A1 | 11/2015 | Hubner et al. |
| 2015/0325075 A1 | 11/2015 | Jones |
| 2015/0353338 A1 | 12/2015 | Nicol et al. |
| 2015/0375984 A1 | 12/2015 | Arcand |
| 2016/0058245 A1 | 3/2016 | Smith et al. |
| 2016/0090288 A1 | 3/2016 | Givens, Jr. et al. |
| 2016/0092851 A1 | 3/2016 | De Berg Hewett |
| 2016/0096715 A1 | 4/2016 | Segiet et al. |
| 2016/0098883 A1 | 4/2016 | Green et al. |
| 2016/0171811 A1 | 6/2016 | Khamphilapanyo et al. |
| 2016/0189461 A1 | 6/2016 | Kanon et al. |
| 2016/0209106 A1 | 7/2016 | Anselmino et al. |
| 2016/0239904 A1 | 8/2016 | Washington et al. |
| 2016/0245852 A1 | 8/2016 | Warburton et al. |
| 2016/0264395 A1 | 9/2016 | Hortin |
| 2016/0284153 A1 | 9/2016 | Tansey, Jr. et al. |
| 2016/0314640 A1 | 10/2016 | Ward et al. |
| 2016/0351001 A1 | 12/2016 | Hirshbain |
| 2016/0363921 A1 | 12/2016 | Martindale et al. |
| 2016/0368752 A1 | 12/2016 | Bethuy et al. |
| 2016/0368753 A1 | 12/2016 | Bethuy et al. |
| 2017/0008750 A1 | 1/2017 | Hernandez et al. |
| 2017/0088410 A1 | 3/2017 | Wing et al. |
| 2017/0099981 A1 | 4/2017 | Haidar et al. |
| 2017/0121165 A1 | 5/2017 | Gabrieli |
| 2017/0172340 A1 | 6/2017 | Baarman et al. |
| 2017/0186110 A1 | 6/2017 | Carpenter et al. |
| 2017/0224151 A1 | 8/2017 | Rithener et al. |
| 2017/0275147 A1 | 9/2017 | Moezedis |
| 2017/0293983 A1 | 10/2017 | Long |
| 2017/0300936 A1 | 10/2017 | Wilkinson et al. |
| 2017/0301173 A1 | 10/2017 | Hindsgaul et al. |
| 2017/0330164 A1 | 11/2017 | Suelberg |
| 2017/0345245 A1 | 11/2017 | Torresani et al. |
| 2018/0029859 A1 | 2/2018 | Hevia et al. |
| 2018/0044158 A1 | 2/2018 | Jersey et al. |
| 2018/0086621 A1 | 3/2018 | Dubief et al. |
| 2018/0099850 A1 | 4/2018 | Lyons et al. |
| 2018/0137461 A1 | 5/2018 | Wilkinson et al. |
| 2018/0186621 A1 | 7/2018 | Jangbarwala et al. |
| 2018/0211235 A1 | 7/2018 | Geigel et al. |
| 2018/0251361 A1 | 9/2018 | Wing et al. |
| 2018/0265344 A1 | 9/2018 | Keating et al. |
| 2018/0288594 A1 | 10/2018 | Kim |
| 2018/0300702 A1 | 10/2018 | Li et al. |
| 2018/0308079 A1 | 10/2018 | Zong et al. |
| 2018/0327243 A1 | 11/2018 | Rider et al. |
| 2018/0362321 A1 | 12/2018 | Lim et al. |
| 2018/0365668 A1 | 12/2018 | Hay |
| 2018/0365924 A1 | 12/2018 | Yoakim et al. |
| 2019/0012498 A1 | 1/2019 | Mahncke |
| 2019/0019210 A1 | 1/2019 | Yamazaki et al. |
| 2019/0025108 A1 | 1/2019 | Jones |
| 2019/0034901 A1 | 1/2019 | Gaur et al. |
| 2019/0071298 A1 | 3/2019 | Tomforde et al. |
| 2019/0073648 A1 | 3/2019 | Salvucci et al. |
| 2019/0108709 A1 | 4/2019 | Yamazaki et al. |
| 2019/0135607 A1 | 5/2019 | Petermann |
| 2019/0172297 A1 | 6/2019 | Schwarber et al. |
| 2019/0174933 A1 | 6/2019 | Auda et al. |
| 2019/0180262 A1 | 6/2019 | Huang et al. |
| 2019/0188667 A1 | 6/2019 | Wolfson |
| 2019/0202680 A1 | 7/2019 | Rider et al. |
| 2019/0205858 A1 | 7/2019 | Tang et al. |
| 2019/0251522 A1 | 8/2019 | Wallis |
| 2019/0287089 A1 | 9/2019 | Mahncke |
| 2019/0295354 A1 | 9/2019 | Chon et al. |
| 2019/0300357 A1 | 10/2019 | Crawford et al. |
| 2019/0387768 A1 | 12/2019 | Levi |
| 2019/0392666 A1* | 12/2019 | Osborn .............. G06K 19/0723 |
| 2020/0031656 A1 | 1/2020 | Rudick et al. |
| 2020/0034808 A1 | 1/2020 | Kamat |
| 2020/0074440 A1 | 3/2020 | Fullman et al. |
| 2020/0098218 A1 | 3/2020 | Hartmann et al. |
| 2020/0122994 A1 | 4/2020 | Cimatti et al. |
| 2020/0134960 A1 | 4/2020 | Kingston et al. |
| 2020/0196793 A1 | 6/2020 | Ninomiya et al. |
| 2020/0198958 A1 | 6/2020 | Kline et al. |
| 2020/0226628 A1 | 7/2020 | Snider et al. |
| 2020/0236175 A1 | 7/2020 | Wang |
| 2020/0242584 A1 | 7/2020 | Campbell et al. |
| 2020/0364817 A1* | 11/2020 | Liu ...................... H04L 67/535 |
| 2020/0388099 A1 | 12/2020 | Ji et al. |
| 2021/0039942 A1 | 2/2021 | Springer |
| 2021/0081939 A1 | 3/2021 | Kuenzi et al. |
| 2021/0087043 A1 | 3/2021 | Szeteli et al. |
| 2021/0147209 A1 | 5/2021 | Cuppari |
| 2021/0150539 A1 | 5/2021 | Yau |
| 2021/0166215 A1* | 6/2021 | Aleksandrov .... G06Q 20/40145 |
| 2021/0194760 A1* | 6/2021 | Barton ................ H04L 41/0803 |

(56) References Cited

U.S. PATENT DOCUMENTS

| | | | |
|---|---|---|---|
| 2021/0197226 A1 | 7/2021 | Turner et al. | |
| 2021/0264714 A1 | 8/2021 | Karibandi et al. | |
| 2021/0327203 A1 | 10/2021 | Nishant | |

FOREIGN PATENT DOCUMENTS

| | | |
|---|---|---|
| EP | 1245010 B1 | 8/2004 |
| EP | 1466307 A1 | 10/2004 |
| EP | 3242277 A1 | 8/2008 |
| EP | 1697908 B1 | 3/2009 |
| EP | 2504271 B1 | 11/2010 |
| EP | 2085000 B1 | 12/2011 |
| EP | 2396271 A2 | 12/2011 |
| EP | 2702543 A1 | 3/2014 |
| EP | 2504245 B1 | 5/2014 |
| EP | 2839423 A2 | 2/2015 |
| EP | 2506746 B1 | 4/2015 |
| EP | 2252542 B1 | 9/2015 |
| EP | 2969900 A1 | 1/2016 |
| EP | 2997468 B1 | 3/2016 |
| EP | 2764481 B1 | 5/2016 |
| EP | 3028477 B1 | 6/2016 |
| EP | 3033740 A1 | 6/2016 |
| EP | 3053151 A1 | 8/2016 |
| EP | 3055632 A1 | 8/2016 |
| EP | 2504270 B1 | 11/2016 |
| EP | 3092612 B1 | 11/2016 |
| EP | 3049364 B1 | 12/2016 |
| EP | 3116823 A1 | 1/2017 |
| EP | 3122239 A1 | 2/2017 |
| EP | 3127077 A1 | 2/2017 |
| EP | 3185731 A1 | 7/2017 |
| EP | 3198570 A1 | 8/2017 |
| EP | 3238166 A1 | 11/2017 |
| EP | 3252722 A1 | 12/2017 |
| EP | 3252723 A1 | 12/2017 |
| EP | 3252724 A1 | 12/2017 |
| EP | 2969904 B1 | 1/2018 |
| EP | 2976975 B1 | 1/2018 |
| EP | 3078306 B1 | 1/2018 |
| EP | 3281166 A1 | 2/2018 |
| EP | 3284053 A1 | 2/2018 |
| EP | 3287993 A1 | 2/2018 |
| EP | 3291128 A1 | 3/2018 |
| EP | 3300496 B1 | 4/2018 |
| EP | 3324370 A1 | 5/2018 |
| EP | 3357020 A1 | 8/2018 |
| EP | 3357044 A1 | 8/2018 |
| EP | 3360115 A1 | 8/2018 |
| EP | 3364826 A1 | 8/2018 |
| EP | 2782485 B1 | 10/2018 |
| EP | 3394816 A1 | 10/2018 |
| EP | 3405075 A1 | 11/2018 |
| EP | 3407767 B1 | 12/2018 |
| EP | 3418964 A1 | 12/2018 |
| EP | 3421414 A1 | 1/2019 |
| EP | 3433821 A1 | 1/2019 |
| EP | 1405261 B2 | 2/2019 |
| EP | 3442381 A1 | 2/2019 |
| EP | 3445704 B1 | 2/2019 |
| EP | 3275345 B1 | 3/2019 |
| EP | 3452995 A1 | 3/2019 |
| EP | 3493167 A1 | 6/2019 |
| EP | 3497051 A1 | 6/2019 |
| EP | 2999659 B1 | 7/2019 |
| EP | 3526681 A1 | 8/2019 |
| EP | 2504268 B1 | 9/2019 |
| EP | 3090413 B1 | 11/2019 |
| EP | 2563710 B1 | 12/2019 |
| EP | 3614891 A1 | 3/2020 |
| EP | 3637358 A1 | 4/2020 |
| EP | 3278692 B1 | 8/2020 |
| EP | 3182869 B1 | 10/2020 |
| EP | 3723057 A1 | 10/2020 |
| EP | 3321896 B1 | 11/2020 |
| EP | 3762330 A1 | 1/2021 |
| EP | 3774636 A1 | 2/2021 |
| EP | 3782161 A1 | 2/2021 |
| EP | 3785241 A1 | 3/2021 |
| EP | 3792863 A1 | 3/2021 |
| EP | 3811314 A1 | 4/2021 |
| EP | 2912609 B1 | 6/2021 |
| EP | 3857524 A1 | 8/2021 |
| EP | 3870535 A1 | 9/2021 |
| EP | 3898499 A1 | 10/2021 |
| EP | 3962331 A1 | 3/2022 |
| ES | 2768656 T3 | 6/2020 |
| ES | 1252354 U | 9/2020 |
| ES | 2881226 T3 | 11/2021 |
| GB | 2429694 A | 3/2007 |
| RU | 2726059 C1 | 7/2020 |
| WO | WO 9732284 A1 | 9/1997 |
| WO | WO 0052655 A1 | 9/2000 |
| WO | WO 0112033 A2 | 2/2001 |
| WO | WO 0112034 A2 | 2/2001 |
| WO | WO 0112038 A2 | 2/2001 |
| WO | WO 0117893 A2 | 3/2001 |
| WO | WO 0152621 A2 | 7/2001 |
| WO | WO 0224569 A1 | 3/2002 |
| WO | WO 03005295 A1 | 1/2003 |
| WO | WO 2004024615 A1 | 3/2004 |
| WO | WO 2004030435 A1 | 4/2004 |
| WO | WO 2004096694 A1 | 11/2004 |
| WO | WO 2004097690 A1 | 11/2004 |
| WO | WO 2005003022 A1 | 1/2005 |
| WO | WO 2005043469 A1 | 5/2005 |
| WO | WO 2005111955 A1 | 11/2005 |
| WO | WO 2006021039 A1 | 3/2006 |
| WO | WO 2006066338 A1 | 6/2006 |
| WO | WO 2006125279 A1 | 11/2006 |
| WO | WO 2007015905 A2 | 2/2007 |
| WO | WO 2009016610 A2 | 2/2009 |
| WO | WO 2009032686 A1 | 3/2009 |
| WO | WO 2009032929 A2 | 3/2009 |
| WO | WO 2009032938 A2 | 3/2009 |
| WO | WO 2009032941 A2 | 3/2009 |
| WO | WO 2009032946 A1 | 3/2009 |
| WO | WO 2009058095 A1 | 5/2009 |
| WO | WO 2009111286 A1 | 9/2009 |
| WO | WO 2009111289 A1 | 9/2009 |
| WO | WO 2009111291 A1 | 9/2009 |
| WO | WO 2009115774 A2 | 9/2009 |
| WO | WO 2010010587 A1 | 1/2010 |
| WO | WO 2010093747 A2 | 8/2010 |
| WO | WO 2011066438 A1 | 6/2011 |
| WO | WO 2011066444 A1 | 6/2011 |
| WO | WO 2011066448 A1 | 6/2011 |
| WO | WO 2011067156 A1 | 6/2011 |
| WO | WO 2011067232 A1 | 6/2011 |
| WO | WO 2011094625 A1 | 8/2011 |
| WO | WO 2012032543 A1 | 3/2012 |
| WO | WO 2012058449 A1 | 5/2012 |
| WO | WO 2012083194 A2 | 6/2012 |
| WO | WO 2012084573 A1 | 6/2012 |
| WO | WO 2012129686 A1 | 10/2012 |
| WO | WO 2012134296 A1 | 10/2012 |
| WO | WO 2012145649 A1 | 10/2012 |
| WO | WO 2012174609 A1 | 12/2012 |
| WO | WO 2013011078 A1 | 1/2013 |
| WO | WO 2013055938 A1 | 4/2013 |
| WO | WO 2013114321 A1 | 8/2013 |
| WO | WO 2013124188 A1 | 8/2013 |
| WO | WO 2013158407 A1 | 10/2013 |
| WO | WO 2013190253 A1 | 12/2013 |
| WO | WO 2014076296 A1 | 5/2014 |
| WO | WO 2014091284 A1 | 6/2014 |
| WO | WO 2014096017 A1 | 6/2014 |
| WO | WO2014062846 A3 | 7/2014 |
| WO | WO 2014188389 A1 | 11/2014 |
| WO | WO 2015017559 A1 | 2/2015 |
| WO | WO 2015026767 A1 | 2/2015 |
| WO | WO 2015044494 A1 | 4/2015 |
| WO | WO 2015053837 A2 | 4/2015 |
| WO | WO 2015013399 A1 | 7/2015 |

(56) References Cited

FOREIGN PATENT DOCUMENTS

| | | |
|---|---|---|
| WO | WO 2015148710 A1 | 10/2015 |
| WO | WO 2015153565 A1 | 10/2015 |
| WO | WO 2016011214 A1 | 1/2016 |
| WO | WO 2016048159 A1 | 3/2016 |
| WO | WO 2016053994 A1 | 4/2016 |
| WO | WO 2016073441 A1 | 5/2016 |
| WO | WO 2016154269 A1 | 9/2016 |
| WO | WO 2016162740 A1 | 10/2016 |
| WO | WO 2016168120 A1 | 10/2016 |
| WO | WO 2016191748 A1 | 12/2016 |
| WO | WO 2017015576 A1 | 1/2017 |
| WO | WO 2017062656 A1 | 4/2017 |
| WO | WO 2017085018 A1 | 5/2017 |
| WO | WO 2017112850 A1 | 6/2017 |
| WO | WO 2017160193 A1 | 9/2017 |
| WO | WO 2017192871 A1 | 11/2017 |
| WO | WO 2017205033 A1 | 11/2017 |
| WO | WO 2017211890 A1 | 12/2017 |
| WO | WO 2018035113 A1 | 2/2018 |
| WO | WO 2018071685 A1 | 4/2018 |
| WO | WO 2018125955 A1 | 7/2018 |
| WO | WO 2018226904 A1 | 12/2018 |
| WO | WO 2018231853 A1 | 12/2018 |
| WO | WO 2019067944 A1 | 4/2019 |
| WO | WO 2019121927 A1 | 6/2019 |
| WO | WO 2019246413 A1 | 12/2019 |
| WO | WO 2020089723 A1 | 5/2020 |
| WO | WO 2020115567 A1 | 6/2020 |
| WO | WO 2020132457 A1 | 6/2020 |
| WO | WO 2020136379 A1 | 7/2020 |
| WO | WO 2020243850 A1 | 12/2020 |
| WO | WO 2020252491 A2 | 12/2020 |
| WO | WO 2021015015 A1 | 1/2021 |
| WO | WO 2021019385 A1 | 2/2021 |
| WO | WO 2021025637 A1 | 2/2021 |
| WO | WO 2021167482 A1 | 8/2021 |
| WO | WO 2021195551 A1 | 9/2021 |
| WO | WO 2021198915 A1 | 10/2021 |
| WO | WO 2021200093 A1 | 10/2021 |
| WO | WO 2021205146 A1 | 10/2021 |
| WO | WO 2021216717 A1 | 10/2021 |
| WO | WO 2021221860 A1 | 11/2021 |
| WO | WO 2021236656 A1 | 11/2021 |
| WO | WO 2021247421 A1 | 12/2021 |
| WO | WO 2022030129 A1 | 2/2022 |
| WO | WO 2022031662 A1 | 2/2022 |

* cited by examiner 201 https://example.com/43a989694b9f56dde315-1624744156

205 https://example.com/?machine=43a989694b9f56dde315&time=1624744156

206 https://43a989694b9f56dde315.example.com/1624744156

207 https://example.com/Q6mJaUufVt3jFWDXoNw=

Fig. 6

601: request to the machine

```
{
  "request": "dispense",
  "arguments": {
    "selection": "B7",
    "price": 250,
    "prepaid": true
  }
}
```

602: response to the server

```
{
  "request": "dispense",
  "arguments": {
    "selection": "B7",
    "price": 250,
    "prepaid": true
  },
  "result": {
    "success": true
  }
}
```

METHOD AND SYSTEM OF TOUCH-FREE VENDING

CROSS-REFERENCE TO RELATED APPLICATIONS

This application claims priority to U.S. Provisional Application No. 63/047,047 filed Jul. 1, 2020 by Igor Shturma entitled, "Method of Controlling a Machine with a Handheld Mobile Device", which is incorporated by reference herein.

BACKGROUND OF THE INVENTION

Different sorts of vending and self-service machines can be found in public spaces all around the world. Those are snack and beverage vending machines, ATMs, gas pumps, transit payment kiosks, and others. Traditionally these machines provide a user interface in the form of pushbuttons and a display of some kind. These interfaces are very constrained, not always intuitive, and do not provide users much extra information about the products or services offered by the machine. Another growing concern is that publicly available machines are not regularly cleaned, and the surface of their controls facilitates the spread of pathogen bacteria and viruses. The adoption of interactive screens with touch input in newer machines improves the situation. They are easier to clean and also capable of presenting additional information and better on-screen instructions. Still, more and more people would prefer to interact with public machines and make payments using their personal mobile electronic devices, such as smartphones or tablets.

Many methods exist to accomplish this goal. Typically, they require the user to install an associated application, or "app," to their device. The application then leverages a connectivity technology such as direct short-range wireless networking, typically Bluetooth or Wi-Fi, a Near-Field Communication (NFC), or remote access over the internet.

These methods have multiple weaknesses. First, installing a dedicated app for a single-time interaction with a public machine is a significant inconvenience. Apps take space, clutter devices, affect their performance, and often annoy users with marketing notifications. For those reasons, the requirement to install an app can be seen as an obstacle to the adoption of the technology. Another problem is that the user's functional proximity to the machine is hard to verify. With remote access and wireless communications, users may initiate actions while not being physically present near the machine (proximal). At the minimum, it can be a source of confusion if several people are competing to access a single machine. In some cases, that is also a security concern. A technique known as geofencing is used to address this, but it relies on a positioning technology unreliable in covered spaces, especially in multi-story buildings. Identification of the machine can also be a problem when multiple machines are located close to each other, which is common for vending machines and laundry machines. When using a remote vending controller or interface, disambiguation of both users and vending machine is critical, which is difficult or reliably impossible with current technology.

SUMMARY OF THE INVENTION

Embodiments of the invention overcome weaknesses of the prior art. Described embodiments, scenarios, examples, and drawings are non-limiting.

In embodiments of the present disclosure, the identification of the machine and verification of the functional physical proximity is made through manually reading dynamically generated information from a tag generator with a mobile electronic device. Typically, a particular user of a particular vending machine stands in front of the machine, at a suitable distance from the machine, for a smartphone, or similar device, to read, with its camera, a dynamically generated QR code, or other machine readable code, on a display of the particular vending machine. In this way, both the particular user is disambiguated from other users, and the particular vending machine is disambiguated from other vending machines.

The information from the tag generator is then used to direct the user to a web page provided by a server. The page presents a control and payment interface for the user to interact with. As a result of user selections, after the payment is processed, the server generates requests and transmits them to the machine to dispense a product or render a service.

The tag generator in this disclosure is a device capable of generating and communicating a Uniform Resource Locator (URL) to a mobile electronic device so that the URL can be used to navigate a user client software such as a web browser to the corresponding resource. Non-limiting examples of a tag generator are a device showing a QR code on its display and an active Near Field Communication (NFC) tag generator. The tag generator may be a standalone device as well as a functional part of a larger system. The information encoded into the URL contains a session identifier unique to one interactive session.

In a first embodiment, the information from the tag generator includes a sequence-based parameter encoded into the URL as a compound part of the session identifier or as a separate parameter. The server checks the ordering of the requests. Every subsequent request is expected to be newer than the requests serviced before. Otherwise, it is rejected with or without error notification. That sequence-based parameter may be but not limited to a timestamp, a real-time clock time, a free-running counter value, or a sequential number of the session. A sequence-based parameter is also called a sequence number. Sequence numbers need not comprise a contiguous sequence of numbers of characters. Sequence number need not increase each time it is used. A sequence number may be generated from a random or pseudo-random sequence, provided that every sequence number is unique with respect to all sequence numbers used by the same vending machine.

In another embodiment, the information from the tag generator includes a time-based parameter encoded into the URL as a compound part of the session identifier or as a separate parameter. The server checks requests for expiration, preventing a URL from being and used later. If the timeout is exceeded, the request is rejected with or without error notification. That time-based parameter may be but not limited to a Unix epoch timestamp, a real-time clock time, a free-running counter value. Alternatively, that information may be a key in a time-based encryption scheme, such as timed-release encryption.

In yet another embodiment, information from the tag generator includes the identifier of the machine, encoded into the URL as a compound part of the session identifier or as a separate parameter. The identifier may be any sequence of characters assigned to the machine, such as but not limited to, a serial number of the machine, a sequential number assigned to the machine when it is first registered with the server, a universally unique identifier (UUID), a random number, or any combination of the above. The machine identifier may or may not be encrypted. The information about all registered machines with their identifiers is stored in a database accessible by the server.

In yet another embodiment, information from the tag generator includes a network address that allows the server to direct data packages to the machine. This information may be but not limited to a Media Access Control (MAC) address or an Internet Protocol (IP, e.g., IPv4, IPv6) address with a port number or any combination.

In yet another embodiment, the information from the tag generator includes data about the state of the machine, encoded into the URL as a compound part of the session identifier or as a separate parameter. A non-limiting example of the state would be the real-time product inventory in a vending machine.

In yet another embodiment, the session identifier is communicated by the tag generator to the server over the network connection every time it is generated. When the mobile electronic device requests the web page, the server uses the session identifier to identify the machine without exposing the machine identifier itself to the mobile electronic device.

In yet another embodiment, the server is remote to the machine and accessible over the network, such as a local network or the internet. In another embodiment, the server is executed on a processor within the machine itself.

In yet another embodiment, the machine contains a wired or wireless communication device such as but not limited to cellular, Wi-Fi, or Ethernet device. The server then transmits the action requests, such as a vending action with a product code, to the machine over a network connection.

In yet another embodiment, the machine contains a scanner such as but not limited to a barcode scanner, a two-dimensional barcode scanner, a QR code scanner, or a camera capable of scanning any of those codes. The server then transmits the action requests by instructing the mobile electronic device to show a code, such as but not limited to a barcode, a two-dimensional barcode, or a QR code on the screen. The user is instructed to present the screen of the mobile electronic device to the scanner on the machine.

In yet another embodiment, the machine has a wireless transceiver, such as but not limited to NFC or Bluetooth transceiver. The server then transmits the action requests by instructing the mobile electronic device to transmit those requests to the machine through a wireless connection such as but not limited to NFC connection or Bluetooth connection. The user may be instructed to hover their device over an NFC transceiver.

In yet another embodiment, a payment interface is embedded into the web page, allowing the user to make an online payment. A payment gateway then authorizes the payment, and the server processes the result of the authorization before the machine is requested to render a service or dispense a purchased item.

In yet another embodiment, the tag generator, a communication device, a processor, and an interface device are installed into a machine as a retrofit kit. The communication device connects the processor to the server through a network connection. The processor is connected to a pre-existing central controller of the machine either directly or through the interface device utilizing available electrical interfaces. The interface device is connected to the processor, the machine's controller, button inputs, and visual feedback outputs (such as Light Emitting Diodes, LCD or other display). The interface device is configured to emulate buttons being pressed and to collect the feedback given to the user by pre-existing output devices. The processor is configured to execute sequences of emulated inputs to the machine and process the outputs from the machine to achieve goals resulting from the user's interactions with the display data or web page. The processor may be additionally configured to emulate a cashless payment device. The processor may be additionally configured to collect telemetry data and report it to the server over the network connection.

Non-limiting examples of a machine that may be incorporated into the system according to the present disclosure include a traditional vending machine, a public washing machine, a carwash, a parking meter, a gas pump, and alike.

BRIEF DESCRIPTION OF THE DRAWINGS

FIG. 6 shows an exemplary format of data exchange between a server and a vending machine.

DETAILED DESCRIPTION

Figure 1:
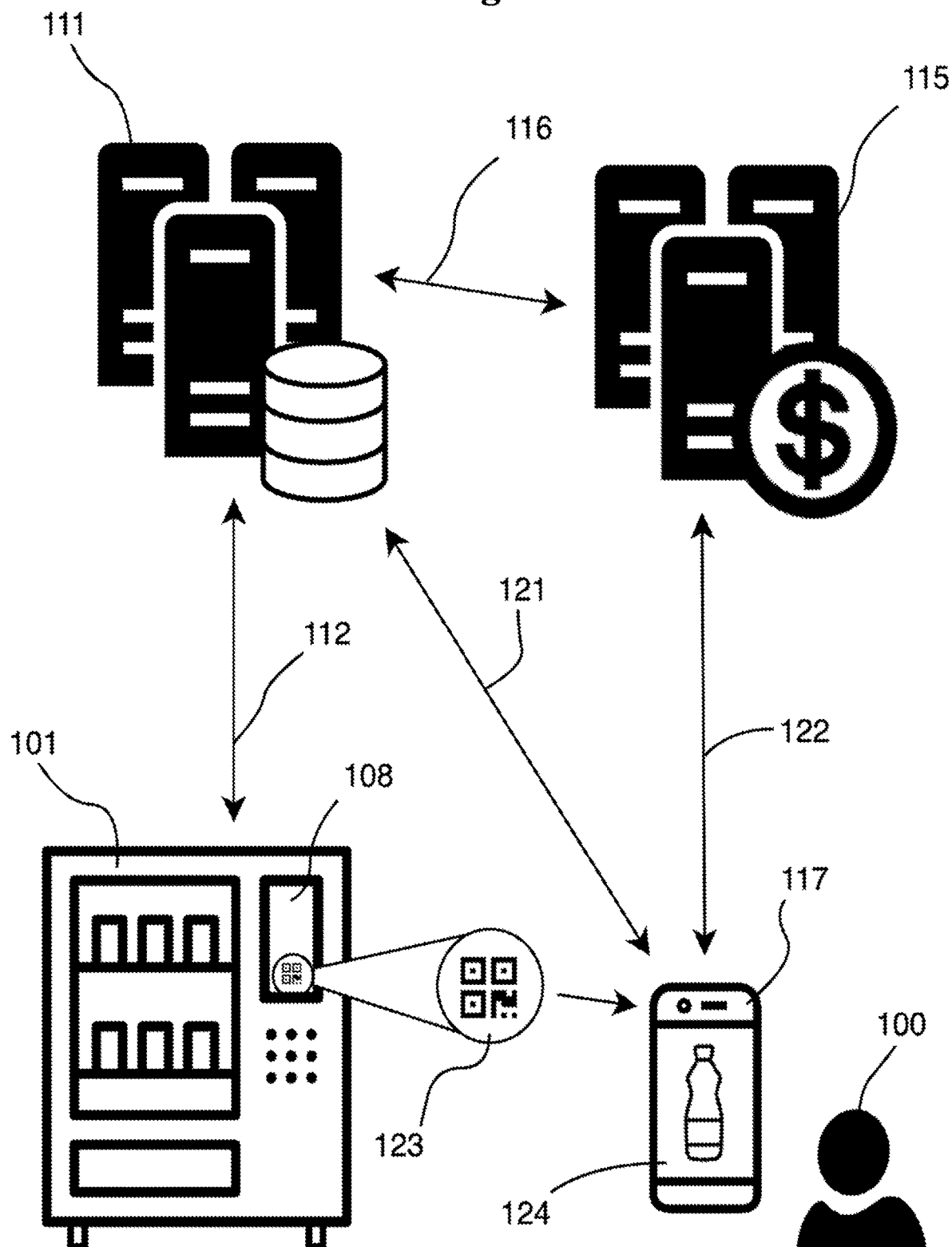
FIG. 1 is a schematic diagram illustrating a first embodiment of the system arrangement and the purchase process.

FIG. 1 illustrates a preferred embodiment of a purchase process or method when controlling or using a vending machine with a personal mobile electronic device, such as a smartphone. A user 100 approaches the vending machine 101 and manually scans a QR code 123 from a tag generator 108 with a camera in or associated with their mobile electronic device 117. The mobile electronic device requests a web page or display data 124 unique to the vending machine from a server 111, such as over a network connection 121. User 100 interacts with the display data 124 to learn about the inventoried products and select a product to vend. After the user 100 selects a product, the server 111 receives a product request from the mobile electronic device 117. The server 111 then requests the checkout from a payment gateway 115, such as over a network connection 116. The server 111 facilitates redirection of the mobile electronic device 117 to a checkout interface provided by the payment gateway 115, such as over a network connection 122. After payment is processed, the mobile electronic device 117 is redirected to another display page provided by the server 111, such as over the network connection 121. The payment gateway 115 notifies the server 111 about the successful payment. The server 111 then requests the vending machine 101 to vend (i.e., dispense) the selected product, such as over a network connection 112. The vending machine 101 then receives a vending action with a product code from the server 111, vends (i.e., dispenses) the product, and notifies the server 111 about a successful vend operation. The server 111 then notifies the mobile electronic device 117 that the vending session is finished.

If dispensing of the product is unsuccessful, the vending machine 101 notifies the server 111, and the server 111 requests the payment processor 115 to issue a refund.

Manually scanning the QR code with the personal mobile electronic device's camera is a deliberate action that the user must take while holding their device near the machine to claim it for the vending session. This way, the user's proximity to the machine is verified. Some embodiments use NFC tag instead of the QR code tag to accomplish the same goal. In this case, the user needs to hold or move their device near the displayed, dynamic tag for it to be machine-read.

The QR code or other tag is unique, either globally or for that particular vending machine. In this way, the same tag cannot be used for more than one vending session.

Figure 2:
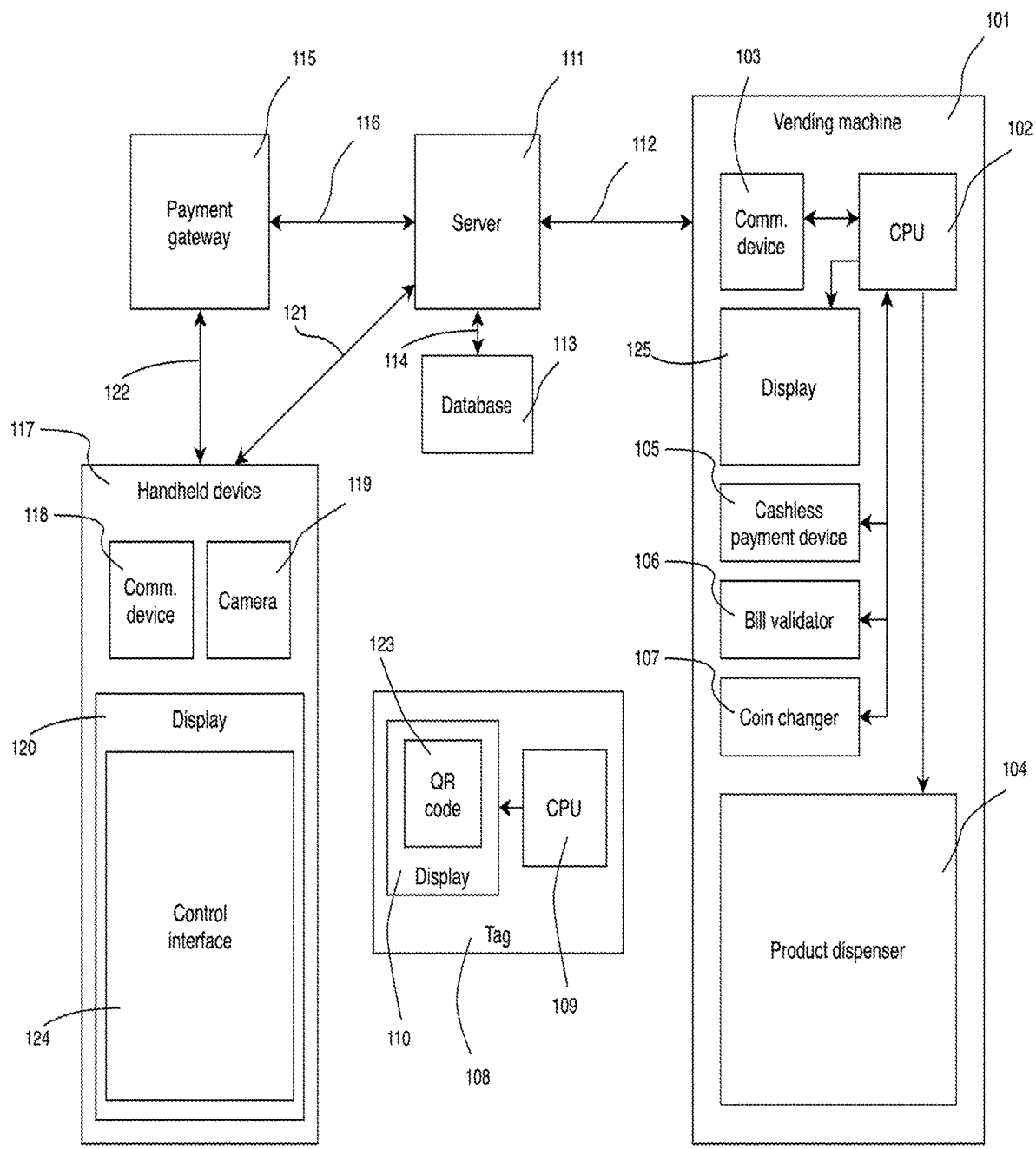
FIG. 2 is a block diagram showing elements of the device and method.

FIG. 2 shows the system diagram of the vending system, according to a preferred embodiment of the present disclosure. The vending machine 101 contains a processor 102, connected to a communication device 103, to a product dispenser 104, to one or more cashless payment devices 105, to a bill validator 106, and a coin changer 107. The tag generator device 108 contains a processor 109 connected to a display 110. The server 111 is connected to the vending machine 101, such as over the network connection 112, through the communication device 103. The server 111 is also connected to a local or remote database 113 over an interface 114. The server 111 is further connected to the payment gateway 115, such as over the network connection 116. Mobile electronic device 117 contains a communication device 118, a camera 119, and a display 120. The mobile electronic device 117 is capable of communicating to the server 111 and the payment gateway 115 over the network connections 121 and 122 correspondingly, using the communication device 118. The vending machine 101 may additionally have at least one display 125 connected to the processor 102.

The processor 109 within the tag generator 108 generates dynamic information containing a session identifier. The identifier is then included in a web URL pointing to a resource on the server 111. The URL is encoded into a QR code 123 that is shown on the display 110. The display 110 is positioned such to be visible to the user.

The user of the mobile electronic device 117 activates the camera 119 and uses it to scan the QR code 123 from the display 110. The software on the mobile electronic device 117 reads the URL from the QR code 123 and opens a client software such as a mobile web browser to request the corresponding resource from the server 111, such as over the network connection 121.

When the server 111 receives the request from the mobile electronic device 117 it extracts and validates the session identifier. Then it extracts the identifier of the vending machine 101 and retrieves the information associated with the machine from the database 113. The server then produces a web page with the display data 124 matching the configuration and the state of the machine and provides it to the client software on the mobile electronic device 117. The client software then presents the web page on the display 120 as the display data 124 for the vending machine 101. The display data 124 may also comprise elements for user selection or input.

The user can interact with elements of the display data 124 to view additional information about the products inventoried by the vending machine 101. When those interactions happen, additional information may be transmitted between the mobile electronic device 117 and the server 111 as necessary. The user can select a product to be purchased. After the selection, the server 111 receives a product request from the mobile electronic device 117. It then requests the checkout from a payment gateway 115, such as over a network connection 116, and redirects the client software on the mobile electronic device 117 to a web page provided by the payment gateway 115. The client software then exchanges information with the payment gateway 115, such as over the network connection 122, to facilitate the payment process. After finishing the payment, the payment gateway 115 redirects the client software on the mobile electronic device 117 to another web page provided by the server 111.

After payment is received, the payment gateway 115 notifies the server 111 about the payment, such as over the network connection 116. The server 111 then generates a vending action for the machine to dispense the product and transmits the request over the network connection 112. The processor 102 in the vending machine 101 receives the vending action with a product code from the server 111, such as over the network connection 112 through the communication device 103. The processor 102 interprets the request and executes it to dispense the product using the product dispenser 104. The processor 102 then notifies the server 111 about a successful or unsuccessful product dispensing. The server, in turn, generates the notification for the user and transmits it to the mobile electronic device 117, such as over the network connection 121.

If the product dispensing was not successful, the server 111 requests the payment gateway 115 to issue a refund.

The user may be additionally presented with an option to pay for their purchase on the machine 101. In this case, when the user requests the checkout, no redirection to a page provided by the payment gateway 115 happens. Instead, the server 111 generates a vending action to the machine to process payment first and then dispense the product. The processor 102 in the vending machine 101 receives the request from the server 111. The processor 102 interprets the request and waits for the user to make payment using the cashless payment device 105, the bill validator 106, the coin changer 107, or some combination of those. The processor 102 may or may not use any additional displays or other output devices on the machine 101 to prompt the user to make a payment. When payment is received, the processor 102 activates the product dispenser 104 to dispense the product. The processor 102 then notifies the server 111 about successful or unsuccessful product dispensing. The server, in turn, generates the notification for the user and transmits it to the mobile electronic device 117, such as over the network connection 121.

The server 111 and the processor 102 may impose a timeout on receiving the payment.

The tag generator 108 may be placed on the vending machine 101, near or proximal to the vending machine 101, or combined with any part of the vending machine 101. As one example, the processor 109 and the processor 102 may be combined into a single processor. The QR code 123 may be shown on the display 125. Similarly, the tag generator 108 may be combined with one of the cashless payment devices 105.

The database 113 may be of any type, such as but not limited to relational database, NoSQL database, document storage, text file, or any other. The database may contain the information about the real-time product inventory in the vending machine 101, so the product selection may be presented to the user by the server 111 as part of the display data 124. The server 111 may keep track of the real-time inventory and update the database 113 to decrease the inventory every time the product is successfully dispensed.

The processor 102 may notify the server 111 about every transaction in the vending machine accomplished with the cashless payment device 105, the bill validator 106, the coin changer 107, any other available payment method, or without payment. The server 111 may use the notifications to update the database 113 with real-time inventory changes. The server 111 may also write into the database 113 an audit log of all transactions.

The processor 102 may additionally notify the server 111 about any events related to the vending machine 101, such as but not limited to operational failures. The server may store the events in the database 113 and also notify the machine operator when the machine needs service. The database 113 may contain additional information about the products, such as but not limited to product images, detailed description, ingredients, nutritional information. The server 111 may present this information in the display data 124 along with any additional information from external sources.

In some embodiments of the present disclosure, the payment gateway 115 is combined with the server 111, and the payment interface is directly embedded into the display data 124. In such a case, no redirection to the payment interface is necessary.

Figure 3:
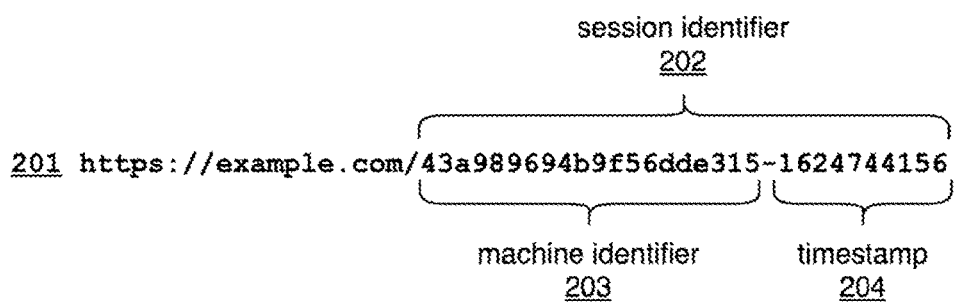
FIG. 3 shows exemplary communication formats with the dynamic tag generator information.
Figure 3:
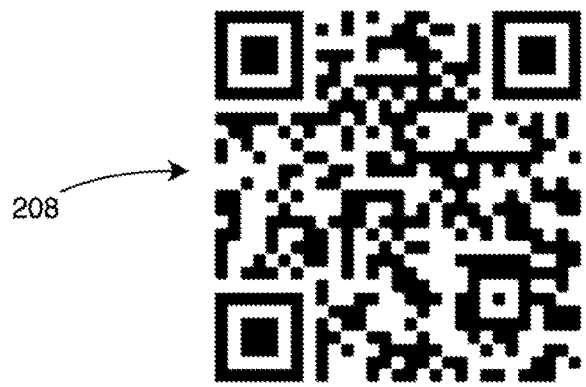

FIG. 3 shows examples of the URL that can be presented on the tag generator. URL 201 contains a compound session identifier 202 within the URL path section. The identifier comprises the machine identifier 203 and the timestamp 204. Here, the timestamp is the Unix epoch time at the moment when the tag was generated. Alternatively, the timestamp may be replaced with a value of a free-running counter, a sequential number of the generated tag, or any other unique identifier.

URL 205 shows the session identifier encoded as key-value pairs within the query section of the URL.

In URL 206, the machine identifier part of the session identifier is encoded as a subdomain.

In URL 207, the session identifier is encoded according to the Base64 encoding scheme for efficiency. 208 is a QR code representation of the URL 207.

Any part of the session identifier may be encrypted for security purposes. Authentication of the URL by the server is preferred, but optional.

Figure 4:
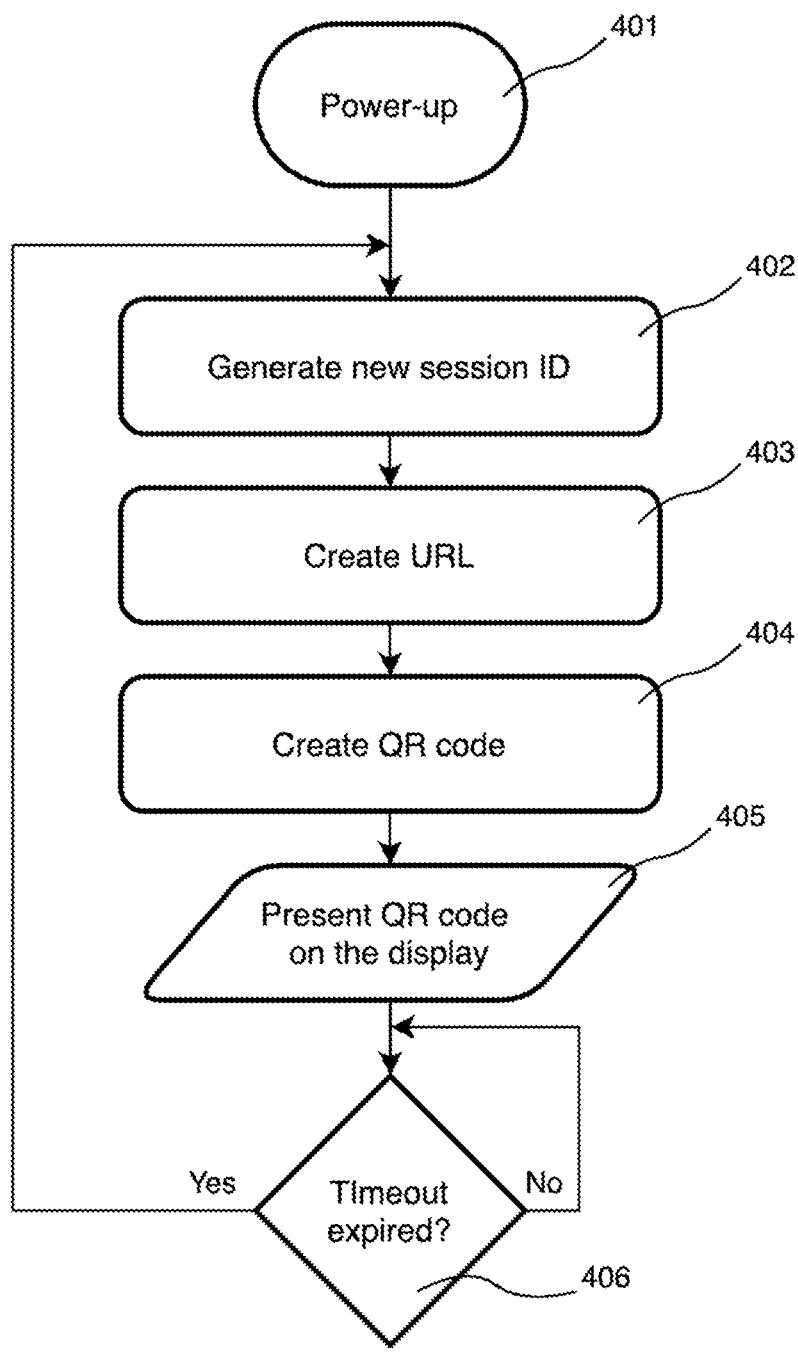
FIG. 4 is a flowchart of exemplary tag generator device operation.

FIG. 4 shows an operational sequence of the processor 109 within the tag generator 108. After the power-up 401, the processor 109 generates a new session identifier at step 402. In the preferred embodiment of the present disclosure, the session identifier comprises a machine identifier and the Unix epoch time as a timestamp. The timestamp part may undergo optional security encryption with any appropriate encryption algorithm, such as those well-known in the art. Encryptions may include error checking, such as parity, or error correction, such as Reed Solomon codes. An example of appropriate encryption is the Advanced Encryption Standard (AES). Encryption may also include authentication. Next, at step 403, the processor 109 creates a URL with the domain name of the server 101 and the session identifier. At this step, the session identifier may be encoded according to Base64 or another appropriate scheme to get a compact sequence of characters suitable for inclusion into a URL. Once the URL is created, it is encoded as a QR code at step 404. At step 405, the QR code is presented on the display 110, comprising a generated tag. After that, at step 406, the processor 109 waits for an expiration of a pre-configured timeout to repeat the whole process from step 402.

In some embodiments, QR codes or other machine-readable codes are encrypted. Public key encryption may be used; however, this encryption method requires dissemination of public and private keys, and so is not a preferred embodiment as of the filing date. Tags may include public keys, for either the vending machine, the vending company, or the user, in any combination.

In an alternative embodiment, if the precise time information is not available to the processor 109, a value of a free-running counter may be used instead. In such a case, a counter may be battery-backed, allowing it to keep counting in the event of power interruption.

Alternatively, a sequentially increasing number may be used for every new session identifier. The last number may be stored by the processor 109 in a non-volatile memory to withstand the power interruption.

Figure 5:
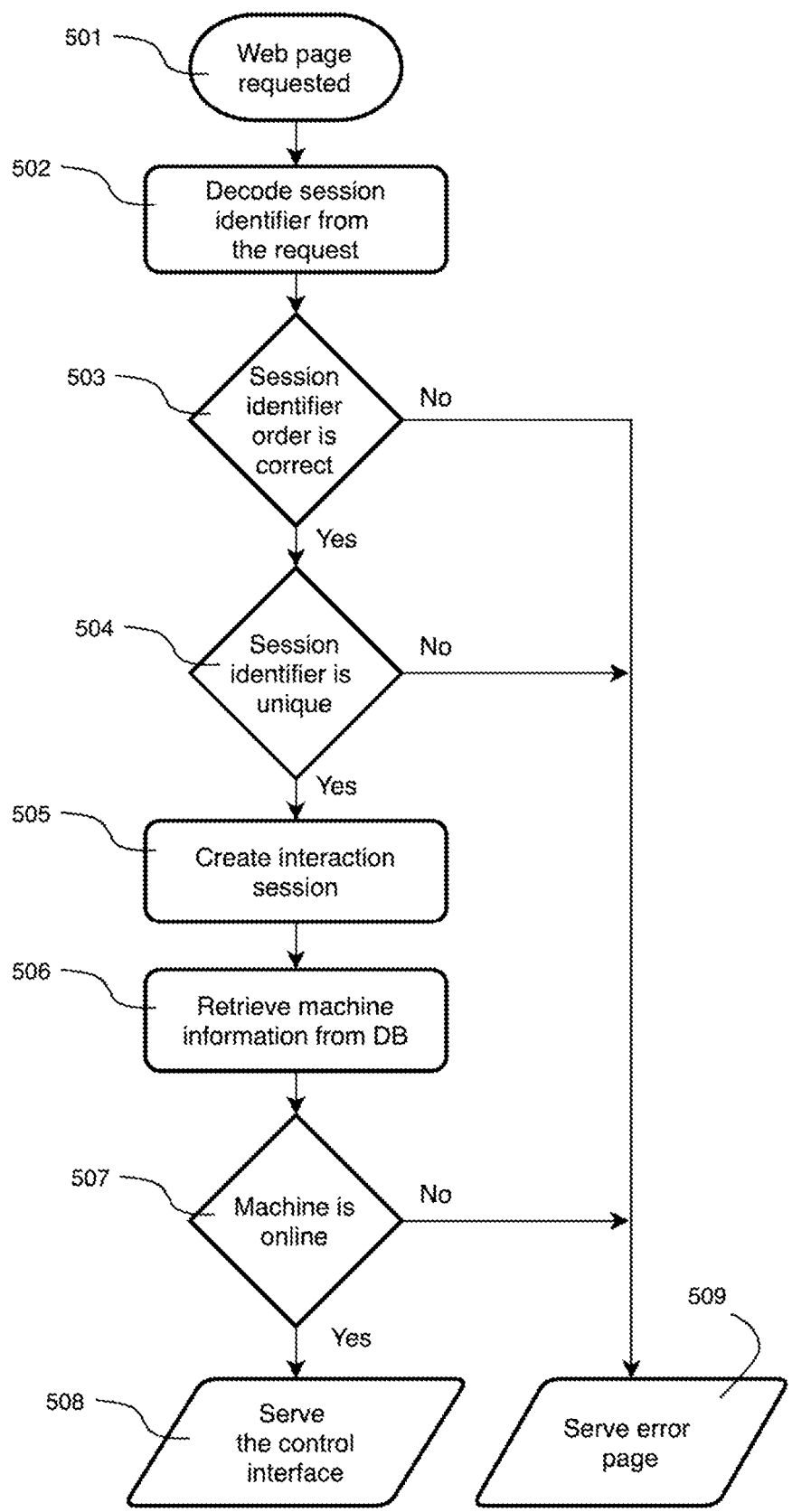
FIG. 5 is a flowchart of exemplary server operation.

FIG. 5 shows an operation cycle performed by the server 111 upon receiving a new request for a web page from the mobile electronic device 117. The cycle starts at step 501 when the server 111 receives a request for a web page with the URL generated by the processor 109. First, on step 502, the server 111 decodes the session identifier from a transport encoding such as Base64 and separates the machine identifier 203 and the timestamp 204 parts. Next, on step 503, the server 111 checks if the session identifier has the correct order based on the timestamp 204. The order is considered correct if the timestamp 204 falls within the expected range of values around the current time. The range accounts for an acceptable delay between the session identifier being generated by the processor 109 and the request being sent by the mobile electronic device 117. The range may further account for the inaccuracy of the internal clock of the processor 109. After the ordering is verified, on step 504, the server 111 queries the database 113 to verify the uniqueness of the session identifier. If the session with the same identifier is not found, the identifier is considered to be unique, and the server then proceeds to step 505 to create a new interaction session by adding a record to the database 113. Then on step 506 the server 111 retrieves from the database 113 the information specific to the machine 101 identified by the machine identifier 203 in the URL. The server 111 then checks the online status of the machine by comparing the time of the last heartbeat communication received from the machine to the present time. If the machine 101 is online, the server 111 proceeds to step 508 and serves the web page comprising the display data 124 to the mobile electronic device 117.

The display data 124 is specific to the machine 101 identified by the machine identifier 203. Therefore, it may vary depending on the type of the machine, its individual settings, and the real-time product inventory.

If at step 503 it was determined that the session identifier is of wrong order, or at step 504 it was determined that the session identifier is not unique, the server transitions to step 509 and serves the error page to the mobile electronic device 117. The server also proceeds to step 509 if at step 507 it was determined that the machine 101 is offline. There may be other reasons, not shown in the figure, for the server to serve the error page instead of the display data 124. The content of the error page may vary based on a specific error reason.

In alternative embodiments that use a value of a free-running counter instead of the Unix epoch time, at step 503, the server 111 retrieves from the database 113 the offset between the time-base of the tag generator processor 109 and real time. In another embodiment, if the sequential numbering is used instead of the timestamp, the server 111 additionally retrieves the previous valid value for the machine 101 identified by the machine identifier 203 from the database 113. The server then checks that the new value is larger than the previous value. Finally, depending on the particular implementation, steps 503 and 504 may be reordered or combined.

FIG. 6 shows an example of the data exchange between the server 111 and the vending machine 101. The request 601 in JSON format specifies the vending action, the product code, the product price in cents, and the prepaid flag. A prepaid flag indicates to the machine 101 that the payment has been processed through the payment gateway 115, and the product is to be dispensed immediately. If the prepaid flag is set to false, the machine 101 is waiting for the payment to be made with the bill validator 106, the coin changer 107, the cashless payment device 105, or a combination of everything above before the product is dispensed.

The response 602 replicates the parameters from the request 601 and indicates the successful vending.

Figure 7:
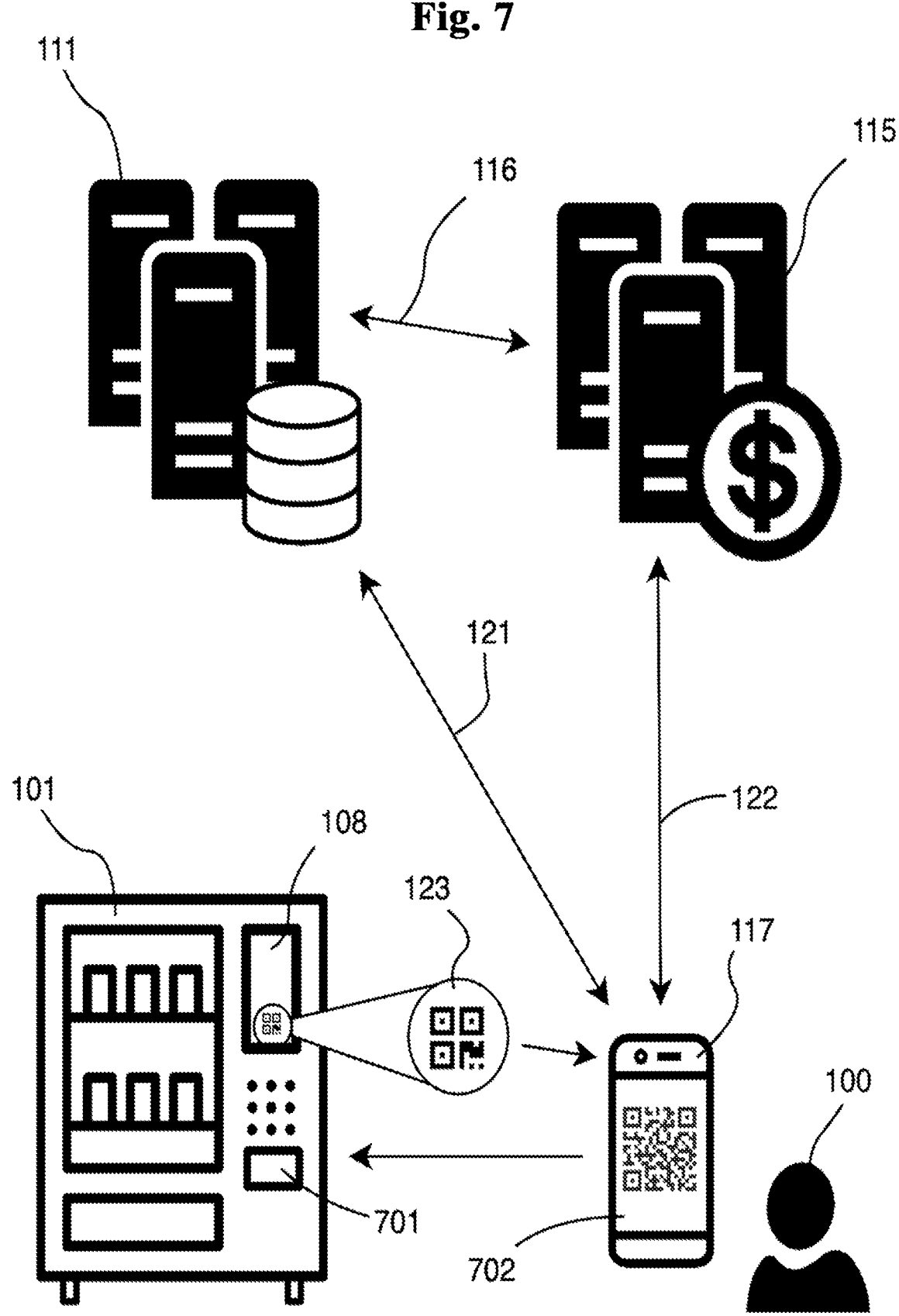
FIG. 7 is a schematic diagram illustrating a second embodiment of the system arrangement and the purchase process.

FIG. 7 illustrates a system arrangement and a purchase process when controlling a vending machine with a mobile electronic device, according to an alternative embodiment of the present disclosure. Adding a code reader 701 to the vending machine 101 allows eliminating the network connection 112 between the vending machine 101 and the server 111.

To initiate the purchase, in one embodiment, the user 100 approaches the vending machine 101 and manually scans the QR code 123 from the tag generator 108 with the camera in or associated with their mobile electronic device 117. Additionally, to the session identifier 202, the URL in the QR code 123 comprises the identification of the real-time product inventory in the machine 101. The mobile electronic device requests a web page from the server 111, such as over the network connection 121, using the URL from the QR code 123. When the server 111 receives the request, it first decodes the information about the real-time product inventory from the URL. It then generates a web page, for example, comprising the display data 124 representing the run-time inventory in the vending machine 101. The user 100 then interacts with the display data 124 to learn about the products and select a product for checkout. When a product is selected, the server 111 receives a product request from the mobile electronic device 117. The server 111 then requests the checkout from the payment gateway 115, such as over the network connection 116. The server facilitates redirection of the mobile electronic device 117 to the checkout interface provided by the payment gateway 115, such as over the network connection 122. After payment is processed, the mobile electronic device 117 is redirected to another page provided by the server 111, such as over the network connection 121. The payment gateway 115 notifies the server 111 about the successful payment. The server 111 then generates a securely encrypted vending code 702 comprising a product code and a vending action for the vending machine 101 to dispense the product. Next, the vending code 702 is transmitted to the mobile electronic device 117. The user 100 demonstrates the vending code 702 from the display of the mobile electronic device 117 to the code reader 701 placed on the vending machine 101. The vending machine 101 receives the product code by optically reading the vending code 702 from the display of the mobile electronic device 117 and dispenses the product.

Disambiguation of both users and vending machines is accomplished with the steps and elements of disclosed methods and systems. See above disclosure for FIG. 1 for discussion of disambiguation.

For a preferred embodiment, a user performs two manual steps with their smartphone or other personal mobile electronic device.

Figure 8:
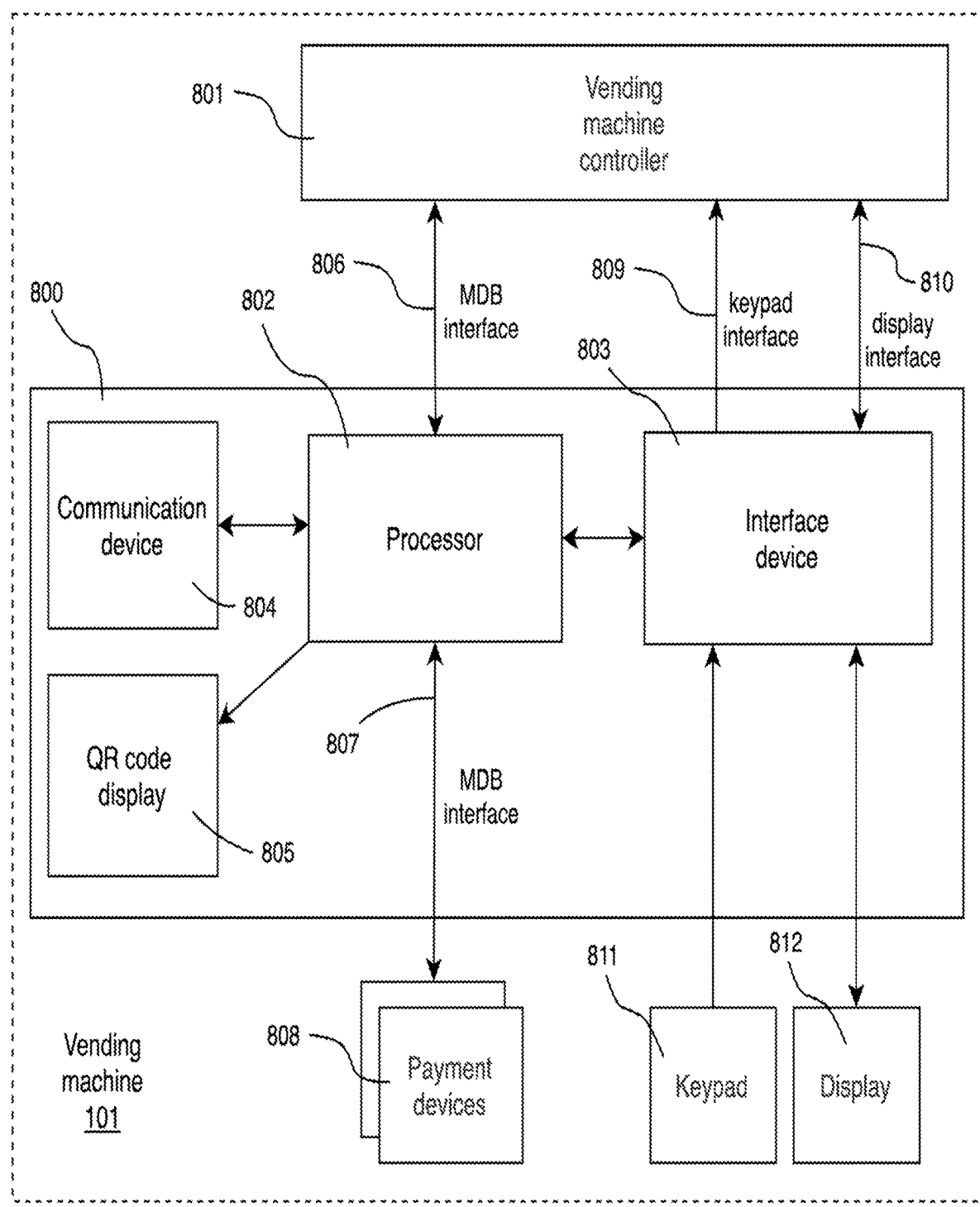
FIG. 8 is an exemplary system diagram incorporating a retrofitted vending machine.

FIG. 8 shows a system diagram of the vending machine 101 with a retrofit device 800 for controlling the vending machine 101 with a personal mobile electronic device 117 according to the present disclosure. The retrofit device 800 is connected to the vending machine controller 801, payment devices 808, a keypad 811, and a vending machine display 812. The retrofit device 800 comprises a processor 802, an interface device 803, a communication device 804, and a QR code display 805. The processor 802 is configured to communicate to the vending machine controller 801 over an MDB interface 806 and emulate peripheral payment devices. On the other hand, the processor 802 is also configured to communicate over a second MDB interface 807 with the peripheral payment devices 808 and emulate a vending machine controller. The processor 802 is further configured to conduct the functions of the tag generator 108 and show QR codes on the display 805. The processor 802 is further configured to communicate to the server 111 through the communication device 804. The processor 802 is further configured to control the interface device 803. The interface device 803 is connected to the vending machine controller 801 over a keypad interface 809 and a display interface 810. The interface device 803 is also connected to the keypad 811, and the vending machine display 812.

When the processor 802 receives a product code and a vending action to dispense a prepaid product such as the request 601, it first communicates a credit to the vending machine controller 801 over the MDB interface 806. The processor 802 then emulates the position selection corresponding to the product code on the keypad interface 809 with the help of the interface device 803.

When the processor 802 receives a product code and a vending action to dispense a product without the prepaid flag being set, it first waits for the peripheral payment devices 808 to establish a credit over the MDB interface 807 and then communicates the credit to the vending machine controller 801 over the MDB interface 806. The processor 802 then emulates the position selection corresponding to the product code on the keypad interface 809 with the help of the interface device 803.

After emulating the position selection, the processor 802 waits for the vending machine controller 801 to report the result of the vend. The processor 802 then reports the result to the server 111.

The processor 802 is also configured to communicate every purchase transaction reported on the MDB interface 806 to the server 111. The server 111 uses that data for audit and real-time inventory tracking.

The processor 802 is also configured to report detectable failures of the vending machine 101 to the server 111 for remote diagnostics. It is further configured to communicate the state of the display 812 collected from the display interface 810 with the help of the interface device 803 to the server 111, allowing remote control and diagnostics.

In further embodiments, a dynamic tag may be audible instead of visible. In such embodiments, an audio signal comprises digital data consistent with the data described in this disclosure for a dynamic tag. The personal mobile electronic device then uses a microphone and suitable software to listen to, decode, and respond to the audio presented by the vending machine. Note that a short-range audio signal still permits disambiguation of multiple users and multiple vending machines, a *nexus* feature of embodiments. "Proximal," for such embodiments, means functionally within a suitable distance to detect and decode the audible tag signal. In such embodiments, a vision-impaired user is able to use vending machines. In such embodiments, product selection by a user may be done with audio communication. For example, rather than "displaying" products on the personal electronic device, the product description would be machine read to the user. Voice recognition, for example, may be used for the user to communicate with the personal electronic device. Claims and embodiments should be construed to include such audible, rather than visible, implementation.

Definitions

"Application" or "App"—in relation to personal mobile electronic devices is a piece of software executable by a mobile electronic device and designed to accomplish a specific goal, e.g., buying products from a vending machine. An application needs to be downloaded and installed on the device before it can be used.

"Disambiguation," "disambiguate"—a method to uniquely identify a person, device, or data, from a different person, device or data, where they might otherwise conflict. For example, two people attempting to use the same vending machine at the same time. As a second example, one person proximal to more than one vending machine, as is common when there are multiple vending machines side-by-side.

"Dispensing"—a vending machine providing a vended product, requested by a user, to the user. The vended product may be associated with the vending machine and may be a specific service, such as a car wash. Vouchers and cards may be a vended product, wherein the voucher or card provides a remote or future service, such as cell-phone minutes, boarding pass, luggage check, discount coupon, a pre-paid shipping, or a pre-paid meal served remotely. A dispensed product may be a physical item such as a can, bottle, or card. A dispensed product may be a quantity of a liquid, such as coffee, car-wash water, or shower water. Another name for "dispense" is "vend." Another name for "dispensing" is "vending."

"MDB"—Multi-Drop Bus, a standardized communication bus and interface(s) typically used inside a vending machine. MDB should be construed broadly to include any standardized communication used by or in vending machines, vending machine equipment, or vending accessories.

"Proximal"—in the context of embodiments of this invention, a user is "proximal" to a personal electronic device when the user may functionally read a screen of the device and functionally control the device. "Functionally read," for this definition, includes audio communication and other methods of a user to communicate with a personal electronic device if the user is, for example, reading impaired. In the context of embodiments of this invention, a personal electronic device is proximal to a vending machine when the personal electronic device is functionally close enough to the vending machine that an optical sensor, such as a camera, in the personal electronic device, is able to machine-read a dynamic tag presented by the vending machine.

A user is "proximal" to a vending machine when the user is functionally close to the vending machine. For example, being able to readily take a vended product. For many vending machines, a proximal user is able to functionally see one or more products available to vend. For products that are not readily visible, a proximal user is able to functionally read type on the face of the vending machine.

"Product code"—data that uniquely identifies a product to a vending machine. Here, "product" refers to a specific type of product, such as "12-oz can of Pepsi Diet Cola," rather than one specific can. A product code may include a location in a vending machine, such as a coil ID. Different vending machines will typically have different product codes, even for the same product, such as a "12-oz can of Pepsi Diet Cola." Product codes may comprise a Universal Product Code (UPC) or product SKU, or a proprietary code.

"QR code," "barcode," or "matrix code" is machine-readable, visible code, such as may be read by a camera on a personal electronic device. A "dynamic" code is one that may be altered dynamically, such as generated by a processor and displayed on a display device. Embodiments use an electronic code, which may not be optically visible, providing the equivalent purpose as a dynamic, visible code. Such codes may be single-use, associated with a specific transaction or sale. Such codes may be encrypted. Such codes may be human-readable.

"Real-time inventory" or "real-time product inventory"—is the list of the products that can be immediately dispensed by a vending machine.

"Receiving"—term wherein a receiving device receives data from a sending device. Such data may be transmitted directly between the sending device and the receiving device, or more typically, the receiving is via one or more intermediary devices, such as switches, routers, access points, optical communication, cellular communication, reflectors, relays, personal electronic devices, and the like.

"Server"—is broadly construed as a term in the art, typically a piece of computational hardware or a virtual portion of computational hardware, usually on a communication network. The term also refers to a piece of software that provides functionality to "client" software by servicing its requests.

"Session" or "vending session"—is a time or functional sequence associated with a single transaction or a grouped in time a series of transactions by a single user. Sessions are typically unique. A "transaction" is typically a selection by a single user and then vending, dispensing or enabling the selected product or service. Some transactions may involve more than one product or service, yet are a single selection by a user. A "session" may be such a single transaction or may include a group of sequential transactions for or by a single user.

"Tag generator"—A tag generator an element capable of displaying or transmitting a unique tag to a user. Non-limiting examples of a tag generator are a device showing a QR code on its display and an active Near Field Communication (NFC) tag generator. The tag generator may be a standalone device or an element of an embodiment.

"Tag"—A tag comprises machine-readable data associated with a specific transaction, purchase, session, or a portion thereof. A tag may also be human-readable. In a preferred embodiment, a tag is presented in a QR code or functional equivalent, readable by a camera and associated processor and software in a personal electronic device. A tag may comprise a URL. A tag may comprise a session identifier. A tag may comprise data to direct a user, or a transaction of a user or portion thereof, to remote data or communication resource, such as a web page. A tag is typically unique to a session.

"URL"—means "Uniform Resource Locator," to be additionally construed as any standardized communication or data format for locating and accessing a server, file, or data path on a network. It may comprise a host name, a domain name, MAC address, IPv4 or IPv6 address, and other data.

"User"—is broadly construed as a person using embodiments of this invention. An alternative name for a user is a customer. A user may also be construed as a device, such as a personal electronic device, being operated by a human in the capacity of a human user or customer using embodiments of this invention.

"Vending action"—an action for a vending machine such as "vend" or "refund." A vending action may comprise information such as audio to play (e.g., "thank you") or images to display on a screen, such as additional recommended products or advertisements. A "vending action" may be a physical action by the vending machine, or it may be data or a command to perform an associated physical vending action. Another name for "vend" is "dispense."

"Vending machine"—means a physical machine that dispenses a specific product or specific service, upon payment or payment method, on demand, typically by a user. Typical products vended include: beverages, snacks, meals, liquids, debit or access cards, vouchers, labels, tokens, insurance, cables, batteries, tools, ice, water, travel tickets, travel convenience items, books, gasoline or other fuel, car washes, showers, rest or sleeping pods, and the like.

"Web page"—an interactive document provided by a server and displayed to a user of mobile electronic device in a client software such as a web browser. One special type of a functionally-rich web page is known as "Progressive Web Application" (PWA).

Ideal, Ideally, Optimal and Preferred—Use of the words, "ideal," "ideally," "optimum," "should," and "preferred," when used in the context of describing this invention, refer specifically to the best mode for one or more embodiments for one or more applications of this invention. Such best modes are non-limiting and may not be the best mode for all embodiments, applications, or implementation technologies, as one trained in the art will appreciate.

All examples are sample or exemplary embodiments. In particular, the phrase "invention" should be interpreted under all conditions to mean "an embodiment of this invention." Examples, scenarios, and drawings are non-limiting. The only limitations of this invention are in the claims.

May, Could, Option, Mode, Alternative and Feature—Use of the words "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements, and limitations of all claims. Embodiments of this invention explicitly include all combinations and sub-combinations of all features, elements, examples, embodiments, tables, values, ranges, and drawings in the specification and the drawings. Embodiments of this invention explicitly include devices and systems to implement any combination of all methods described in the claims, the specification, the abstract, and the drawings. Embodiments of the methods of this invention explicitly include all combinations of dependent method claim steps, in any functional order. Embodiments of the methods of invention explicitly include, when referencing any device claim or limitation thereof, to any and all other device claims, including all combinations of elements in device claims. Claims for devices and systems may be restricted to perform only the methods of embodiments or claims.

We claim:

1. A method of controlling a vending machine with a proximal mobile electronic device comprising the steps:
   (a) generating by a tag generator a dynamic tag unique to a vending session, wherein the dynamic tag comprises a URL;
   (b) presenting the dynamic tag to the proximal mobile electronic device;
   (c) accessing a remote server, by the proximal mobile electronic device, using the dynamic tag;
   (d) transmitting, from the remote server, display data unique to the vending machine; wherein the display data is consistent with a real-time product inventory in the vending machine;
   (e) displaying, on the proximal mobile electronic device, the display data;
   (f) receiving, by the remote server, a product request for a product, from the proximal mobile electronic device; wherein the product is displayed by the display data;
   (g) receiving, by the vending machine, from the remote server, a product code associated with the product in the real-time product inventory;
   (h) receiving, by the vending machine, from the remote server, a vending action associated with the product in the real-time product inventory; and
   (i) dispensing, by the vending machine, the product;
   wherein:
      the method is free of a requirement for a user to download an associated application ("App") to the proximal mobile electronic device.

2. The method of claim 1 wherein:
   the display data is a web page.

3. The method of claim 1 wherein:
   the dynamic tag is unique with respect to all other dynamic tags used by the vending machine.

4. The method of claim 1 wherein:
   the dynamic tag comprises a sequence number that is not repeated for any other dynamic tag used by the vending machine.

5. A system comprising: a vending machine, a tag generator, and a server; wherein
   the system is configured to implement, in conjunction with a proximal mobile electronic device, the steps of claim 1.

6. The method of claim 1, wherein:
   the URL comprises identification of the real-time product inventory in the vending machine.

7. The method of claim 1, wherein:
   the receiving, by the vending machine, from the remote server, the product code associated with the product in the real-time product inventory, is via the proximal mobile electronic device.

8. The method of claim 7, wherein:
   the receiving, by the vending machine, from the remote server, the product code associated with the product in the real-time product inventory, is via optically reading, by the vending machine, displayed on the proximal mobile electronic device, a vending code.

* * * * *